United States Patent Office 3,637,631
Patented Jan. 25, 1972

3,637,631
HOMOPOLYMERIZATION OF VINYL FLUORIDE TO ORIENTABLE POLYVINYL FLUORIDE IN A MEDIUM CONTAINING TERTIARY BUTYL ALCOHOL
Dario Sianesi and Gerardo Caporiccio, Milan, Italy, assignors to Montecatini Edison S.p.A., Milan, Italy
No Drawing. Filed Apr. 8, 1969, Ser. No. 814,431
Claims priority, application Italy, May 10, 1965, 10,491/65
Int. Cl. C08f 3/22
U.S. Cl. 260—92.1     6 Claims

ABSTRACT OF THE DISCLOSURE

There is disclosed herein an improved process for polymerizing vinyl fluoride to orientable polyvinyl fluoride. The orientable homopolymer is obtained by polymerizing vinyl fluoride in tert. butyl alcohol as liquid medium, and in contact with radical initiators under practical temperature and pressure conditions.

---

This application is a continuation-in-part of our application Ser. No. 548,057, filed May, 6, 1966, now abandoned.

PRIOR ART

USP 2,419,010 discloses a process for polymerizing vinyl fluoride with the aid of organic peroxy compounds in a dispersing liquid polymerization medium which is preferably water but may be an organic liquid or a mixture of water and an organic liquid. As disclosed in the patent, homopolymers of vinyl fluoride having a sufficiently high intrinsic viscosity to be orientable cannot be obtained by means of organic peroxy compounds at pressures ordinarily referred to as "high," but only at pressures above 150 atmospheres, and preferably from 200 to 1000 atmospheres, for which specially designed equipment is used. The most desirable operating temperatures disclosed are within the range of from 50° C. to 200° C., and such temperatures must be used in conjunction with pressures in the range from 150 to 2000 atmospheres, preferably 200 to 1000 atmospheres, in order to obtain polyvinyl fluoride having intrinsic viscosity higher than the 0.30 stated in Example 1 of the patent to be about the maximum intrinsic viscosity of polyvinyl fluoride prepared with peroxycatalyst at pressures below 150 atmospheres. In fact, Example 5 of the patent shows that vinyl fluoride polymer prepared using benzoyl peroxide as initiator at 80° C. and 100–125 atmospheres has an intrinsic viscosity of less than 0.35 and is not orientable, and that films pressed from said unorientable polymer are brittle and weak.

The very high pressures required in the patented process for the production or orientable polyvinyl fluoride are objectionable from the engineering point of view and are not practical for the large scale commercial production of polyvinyl fluoride.

USP 2,410,010 includes tert. butyl alcohol as a liquid polymerization medium which may be used in the high pressure process disclosed therein. However, the tert. butyl alcohol is merely one of other organic liquids listed for such use in the patent, including methanol and ethanol, which, as is known (Jr. Applied Science, 4, 56–61, 1960), cause chain transfer when used in a radical polymerization process and result in polymers of very low viscosity of the order shown in USP 2,419,010 to be associated with polyvinyl fluoride prepared in the presence of an organic peroxy compound at pressures below 150 atmospheres and which is non-orientable.

THE PRESENT INVENTION

This invention provides a practical process for polymerizing vinyl fluoride to orientable polyvinyl fluoride which is based on our discovery of the specificity of the particular alcohol for use as polymerization liquid medium in the homo-polymerization of vinyl fluoride in contact with initiators as disclosed herein.

The specificity resides in that, when used as liquid polymerization medium in the homopolymerization of vinyl fluoride tert. butyl alcohol permits us to obtain orientable polyvinyl fluoride without the use of pressures above 100 atmospheres and the specially designed equipment required when the high pressures are employed.

In accordance with our invention, using a liquid polymerization medium consisting of, specifically, tert. butyl alcohol, vinyl fluoride is homopolymerized to polyvinyl fluoride having an intrinsic viscosity higher than 1.5 (100 cc./g.) at a pressure between 1 and 100 atmospheres, preferably between 2 and 70 atmospheres, which pressures do not require the use of specially designed equipment. The homopolymers obtained can be formed into films, fibers and other manufactured articles which can be oriented by stretching and, after such orientation, exhibit excellent physical properties which adapt the manufactured articles to a wide variety of uses.

The homopolymerization of vinyl fluoride in tert. butyl alcohol at the low to moderate pressure preferably between 2 and 70 atmospheres is carried out in the presence of an organic or inorganic peroxidic compound, hydrogen peroxide, or an alkylborane plus oxygen as a radical initiator and at a temperature between 0° C. and 150° C. The initiators can be employed in amounts between 0.001 and 5 parts by weight per 100 parts by weight of vinyl fluoride. Preferably, the initiator is present in a proportion between 0.01 and 2% by weight.

It is believed the best results are obtained when the tert. butyl alcohol used as the polymerization liquid medium is used in an amount between 0.02 and 20 parts by weight, preferably between 0.1 and 10 parts by weight for 1 part by weight of vinyl fluoride.

Among the initiators which give completely satisfactory results in the practice of this invention can be mentioned, for instance, percarbonates, persulphates of ammonium or alkali metals, organic peroxides and hydroperoxides (for instance benzoyl, acetyl, lauryl, di-t. butyl, cyclohexanone peroxides, cumene hydroperoxides, tert. butyl hydroperoxide, or diisopropylperoxy-dicarbonate), organic peroxy acids or anhydrides, or peresters or salts thereof.

As indicated, the homopolymerization of vinyl fluoride in the liquid polymerization medium consisting of, specifically tert. butyl alcohol, gives rise, under low to moderate conditions of pressure and temperature to the formation of orientable polyvinyl fluoride having a rather high molecular weight, for instance having an intrinsic viscosity higher than 1.5 (100 cc./g.) which is suitable for the formation of films and fibers and which, according to the prior art could be obtained only by operating under a pressure of at least 150 atmospheres, preferably at 200 to 1000 atmospheres, and using specially designed high-pressure equipment.

It is quite surprising that when tert. butyl alcohol is used as the polymerization solvent or diluent in the homopolymerization of vinyl fluoride it has no limiting effect on the molecular weight of the homopolymer obtained, but on the contrary results in molecular weights and polymerization rates even higher than are obtainable when undiluted vinyl fluoride is polymerized with the aid of the same initiators at the same temperature. Thus, the above-defined initiators when in solution in, specifically, tert. butyl alcohol, are highly suitable for the homopolymerization of vinyl fluoride to orientable polyvinyl fluoride, whereas the same initiators, having been experimented with in regard to vinyl fluoride in other reaction media, such as water or organic diluents different from tert. butyl alcohol, did not give satisfactory results at low to moderate pressures. The initiators gave, in fact, low reaction artes, limited yields of polyvinyl fluoride which, except when used at high pressures requiring specially designed equipment, had an intrinsic viscosity, for instance below 0.5, too low for the polyvinyl fluoride which was obtained to be orientable. Probably this depends upon the fact that, since the employable initiators under these conditions are active at a temperature higher than the critical temperature of the monomer, very high pressures are necessary to reach a sufficient concentration of vinyl fluoride in the reaction zone.

In practicing the present invention, other ingredients can be introduced into the reaction system, besides the monomer, the initiator, and the tert. butyl alcohol, such as buffering agents, dispersing agents, emulsifiers and modifiers, in accordance with principles and techniques known in the art of free radical polymerization.

The process can be carried out in a continuous or discontinuous way.

Temperatures between 0° C. and 150° C. may be used. However, the most advantageous results are obtained in the temperature range between 20° C. and 100° C.

As indicated, the polyvinyl fluoride obtained by the present process normally has a rather high molecular weight. When adopting as a measure of the molecular weight the intrinsic viscosity of the homopolymer determined in dimethylformamide solution having a concentration of about 0.3%, at 110° C., it has been found that the vinyl fluoride homopolymers have an intrinsic viscosity higher than 1.5 (100 cc./g.) and generally between 2 and 6.

The polyvinyl fluoride obtained by the present process is highly crystalline, having a crystallinity, for instance, higher than 30%, and has a crystalline melting temperature higher than 195° C., usually between 200° C. and 220° C. In general, it has been observed that the lower the temperature, within the limits stated, the higher the melting temperature of the polyvinyl fluoride obtained.

Samples of polyvinyl fluoride obtained by the process of this invention, heated at about 160° C. with an equal weight of a solvent such as dimethylsulphoxide, have given homogeneous solutions which, upon cooling, gave rise to the formation of gels. By extrusion or molding, and elimination of the residual solvent, transparent, flexible films have been obtained. The films are orientable by stretching in the cold and have excellent mechanical properties and chemical resistance.

The following examples and tables report various runs on the homopolymerization of vinyl fluoride according to this invention. In order to show the surprising specificity of tert. butyl alcohol as polymerization solvent, the tables report the results of comparative tests carried out under analogous reaction conditions but in the absence of diluents or in the presence of liquid polymerization media other than tert. butyl alcohol. From examination of the tables, one can immediately appreciate the improvements in the percent conversion of vinyl fluoride to polyvinyl fluoride, and in the intrinsic viscosity of the homopolymer which is achieved by the use of tert. butyl alcohol as the polymerization solvent in combination with the particular catalyst employed.

The polymerization runs of the tables were carried out in stainless steel autoclaves having a capacity of 50 cc. and polyvinyl fluoride.

The percent yield given for the different runs is the percent of the monomer, in grams, which is converted to polyvinyl fluoride.

The intrinsic viscosities reported were determined at 110° C. on 0.3% dimethylformamide solutions of the homopolymers.

The following examples illustrate the invention. As noted above, there are given comparative examples which are not according to the invention.

EXAMPLES 1-2

In a 50 cc. stainless steel autoclave, various tests of polymerization of vinyl fluoride are carried out, using as radical initiator dibenzoylperoxide and varying the solvent or dispersing agent, as indicated in Table 1. The autoclave was cooled to —80° C. and catalyst, monomer and 6 cc. of deaerated water introduced. The initial amount of monomer used in each mixture was 15 g. From the data reported in Table 1 it appears clearly that only the polymer obtained by polymerizing the monomer in the presence of tertiary butyl alcohol, has an intrinsic viscosity higher than 1.5, and is thus clearly distinguished from the polymers of the comparative examples, in which a different solvent or a dispersing agent was used.

TABLE 1

| Catalytic system (0.25×10⁻³ g. mol) | | Solvent or dispersing agent | Cc. | Polymerization temp. (° C.) | Polymerization duration (hours) | Yield of polymer obtained (percent) | Intrinsic viscosity (100 cc./g.) |
|---|---|---|---|---|---|---|---|
| Example: | | | | | | | |
| 1 | Dibenzoylperoxide | Tert. C₄H₉OH | 15 | 70 | 16 | 40 | 2 |
| 2 | do | Tert. C₄H₉OH | 15 | 50 | 16 | 15 | 2.1 |
| Counterex (a) | do | Ethylacetate | 10 | 70 | 16 | 20 | 0.35 |
| Counterex (b) | do | Acetone | 10 | 70 | 16 | 25 | 0.20 |
| Counterex (c) | do | Methanol | 10 | 70 | 16 | 13 | 0.14 |
| Counterex (d) | do | Water | 15 | 70 | 16 | 1 | |
| Counterex (e) | do | do | 15 | 50 | 16 | 1 | |
| Counterex (f) | do | | | 70 | 16 | 0 | |
| Counterex (g) | do | | | 50 | 16 | 11 | |

EXAMPLES 3-6

Numerous tests of the polymerization of vinyl fluoride have been carried out following the process of Example 1, but using a different radical initiator in the presence of tertiary butyl alcohol and other solvents or dispersing agents. In the following Table 2 data relating to Examples 3-6 and comparative examples are listed. From the results it can be observed that by operating according to Examples 3-6 polymers are obtained having an intrinsic viscosity much higher than that of the products of the comparative examples, and in yields decidedly better than those obtained when using solvents different from tertiary butyl alcohol.

TABLE 2

| | Catalytic system (0.25×10⁻³ g. mol) | Solvent or dispersing agent | Cc. | Polymerization temp. (° C.) | Duration of polymerization (hours) | Yield of polymer obtained (percent) | Intrinsic viscosity (100 cc./g.) |
|---|---|---|---|---|---|---|---|
| Example 3 | Diisopropylperoxydicarbonate | Tert. butyl alcohol | 15 | 40 | 5 | 75 | 3.2 |
| Example 4 | do | Tert. butyl alcohol | 30 | 40 | 5 | 70 | 2.95 |
| Comparative example | do | Cyclohexane | 10 | 40 | 5 | 15 | 0.4 |
| Do | do | Benzene | 10 | 40 | 5 | 1 | 0.15 |
| Do | do | Ethylacetate | 10 | 40 | 5 | 30 | 0.45 |
| Do | do | do | 3 | 40 | 5 | 25 | 0.9 |
| Do | do | Methanol | 10 | 40 | 5 | 6 | 0.25 |
| Do | do | Acetone | 10 | 40 | 5 | 15 | 0.18 |
| Do | do | Water | 15 | 40 | 16 | 45 | 1.02 |
| Do | do | | | 40 | 16 | 20 | 0.87 |
| Example 5 | B(iC₄H₉)₃+0.1×10⁻³ g. mols of oxygen | Tertbutyl alcohol | 15 | 30 | 5 | 80 | 3.9 |
| Example 6 | do | Tertbutyl alcohol | 30 | 30 | 5 | 75 | 3.3 |
| Comparative examples | do | Water | 15 | 30 | 16 | 5 | 0.65 |
| Do | do | Cyclohexane | 10 | 30 | 5 | 40 | 0.25 |
| Do | do | Ethyl acetate | 10 | 30 | 5 | 50 | 0.5 |
| Do | do | do | 3 | 30 | 5 | 55 | 0.95 |
| Do | do | Methylene dichloride | 10 | 30 | 5 | 20 | 0.21 |
| Do | do | N,N-dimethylformamide | 10 | 30 | 5 | 15 | 0.17 |

As is apparent from inspection of Table 1, counter example (c), when methanol is used as the liquid polymerization medium, instead of tert. butyl alcohol, and dibenzoyl peroxide as the initiator, only 13% of the vinyl fluoride was converted to polymer and the intrinsic viscosity of the polymer was only 0.14. As further shown in Table 2, counter example (e), the use of methanol as the liquid polymerization medium and diisopropylperoxydicarbonate as the initiator, resulted in conversion of 6% of the vinyl fluoride used to a polymer having an intrinsic viscosity of only 0.25.

In addition, other comparative runs, designated A and B were carried out as follows:

RUN A

Using the same technique and autoclave as in Examples 1–2, 20 g. of deaerated water and 0.02 g. of benzoyl peroxide were introduced into the autoclave under nitrogen. A reduced pressure was applied, and 10 g. of vinyl fluoride were introduced by distillation at −80° C. under reduced pressure. The autoclave was then heated to 80° C. and simultaneously water was introduced by means of a dosing feeder pump, raising the pressure to 100 atm. During the polymerization, the pressure decreased slowly down to 80 atm. and was raised again to 100 atm. by injecting more water. After a reaction time of 10 hours at the pressure comprised between 80 and 100 atm., the reaction was stopped and the polymer (1.5 g.) was recovered. It had an intrinsic viscosity of about 0.3 in cyclohexanone at 144° C. All attempts to obtain a flexible sheet or film by press-molding this polymer under high pressure were unsuccessful.

RUN B

Using the technique and autoclave of Run A, 20 g. of methanol and 0.02 g. of benzoyl peroxide were introduced into the autoclave under nitrogen. After applying a reduced pressure, 10 g. of vinyl fluoride were introduced by distillation at −80° C. under reduced pressure. The autoclave was then heated to 80° C. and simultaneously methanol was introduced by means of a dosing feeder pump, raising the pressure up to 100 atm. During the polymerization, the pressure decreased slowly down to 80 atm. It was raised again to 100 atm. by injecting more methanol. The polymerization was carried out for 10 hours, with repeated adjustment of the pressure to 100 atm. as soon as it fell to 80 atm. by introduction of methanol by means of the dosing pump. After 10 hours, 1.3 g. of polymer was obtained. It had an intrinsic viscosity of 0.21, determined in cyclohexanone at 144° C. Press-molded strips of this polymer are brittle and, lacking resistance to stretching, cannot be oriented.

Similar results are obtained when ethanol is used as the liquid polymerization medium.

EXAMPLE 7

Into a stainless steel autoclave of 50 cc., kept in a nitrogen atmosphere and cooled at −80° C., 0.25×10⁻³ g. mols of ammonium persulphate, 9 cc. of tertiary butyl alcohol and 6 cc. of deaerated water are subsequently introduced. The autoclave is closed, vacuum is brought about in it, and keeping it at −80° C. 15 g. of vinyl fluoride are introduced into it by means of vacuum distillation. Then the autoclave is allowed to react for 16 hours under stirring in a thermostatic bath at 50° C. At the end of this period, the non-reacted monomer is removed, and the contents of the autoclave are poured into a excess of hot aqueous methanol, acidified with HNO₃, filtered, washed with boiling pure methanol, dried to constant weight at 100° C. under vacuum of 15 mm. Hg., and washed.

The polymer obtained has a yield of 55%, based on the 15 g. of monomer charged, and an intrinsic viscosity equal to 3 (100 cc./g). It is highly crystalline, having a crystallinity higher than 30%.

For the purpose of comparison, the polymerization of vinyl fluoride was repeated twice, using the same catalyst and the same operating conditions described, but using as solvent or dispersing agent, in place of the previous mixture of tertiary butyl alcohol and water, respectively 15 cc. of water, and a mixture of 9 cc. of methanol and 6 cc. of water.

The polymers obtained in said tests have a low intrinsic viscosity, respectively 0.8, and 0.15 (100 cc./g.), and a low yield of polymer, 5% and 6%, respectively.

Some changes in details may be made in practicing the invention, without departing from the spirit thereof. Therefore, we intend to include in the scope of the appended claims all such modifications as will be obvious to those skilled in the art from the description and working examples given herein.

What we claim is:

1. A process for the preparation of orientable homopolymers of vinyl fluoride having an intrinsic viscosity higher than 1.5 (100 cc./g.) which comprises polymerizing vinyl fluoride in the presence of an organic peroxidic compound, hydrogen peroxide or a mixture of an alkylborene plus oxygen, as radical initiator, and, as the only polymerization medium, of a medium selected from the group consisting of tertiary butyl alcohol and of mixtures of tertiary butyl alcohol with water, in which mixtures the alcohol is the major constituent, in an amount between 0.02 and 20 parts by weight per part of vinyl fluoride, at a temperature between 0° C. and 150° C. and a pressure between 2 and 70 atmospheres.

2. The process according to claim 1, in which the lone polymerization medium is tertiary butyl alcohol.

3. A process according to claim 1 in which the said amount of tertiary butyl alcohol is between 0.1 and 10 parts by weight.

4. A process according to claim 1 wherein the initiator is a percarbonate, an organic peroxide, an organic peroxy acid or anhydride or a perester or persalt thereof.

5. A process according to claim 1, wherein the initiator is used in an amount between 0.001 and 5 parts by weight per 100 parts by weight of vinyl fluoride.

6. A process according to claim 5 in which the said amount of initiator is between 0.01 and 2 parts by weight.

References Cited

UNITED STATES PATENTS

| 2,419,010 | 4/1947 | Coffman et al. | 260—92.1 |
| 2,423,749 | 7/1947 | Austin | 260—92.1 |
| 2,599,300 | 6/1952 | Upson | 260—92.1 |

HARRY WONG, JR., Primary Examiner

U.S. Cl. X.R.

260—30.8, 32.6

UNITED STATES PATENT OFFICE
CERTIFICATE OF CORRECTION

Patent No. 3,637,631  Dated January 25, 1972

Inventor(s) DARIO SIANESI ET AL

It is certified that error appears in the above-identified patent and that said Letters Patent are hereby corrected as shown below:

Col. 1, line 55, between "production" and "orientable", "or" should read -- of --; col. 3, line 20, "artes" should read -- rates --; col. 4, line 22, "polyvinyl chloride" should read -- using 15 g of vinyl fluoride. --.

Signed and sealed this 15th day of May 1973.

(SEAL)
Attest:

EDWARD M. FLETCHER, JR.
Attesting Officer

ROBERT GOTTSCHALK
Commissioner of Patents